United States Patent
Tyhurst

(10) Patent No.: US 7,783,981 B2
(45) Date of Patent: Aug. 24, 2010

(54) COMPUTER PERIPHERAL PRODUCT AND METHOD OF BRANDING UTILITY SOFTWARE ASSOCIATED WITH SAME

(75) Inventor: Timothy R. Tyhurst, Kitchener (CA)

(73) Assignee: Research In Motion Limited, Waterloo (CA)

(*) Notice: Subject to any disclaimer, the term of this patent is extended or adjusted under 35 U.S.C. 154(b) by 1073 days.

(21) Appl. No.: 10/740,049

(22) Filed: Dec. 18, 2003

(65) Prior Publication Data

US 2005/0138616 A1    Jun. 23, 2005

(51) Int. Cl.
 *G06F 3/00* (2006.01)
(52) U.S. Cl. .................................. 715/744; 710/10
(58) Field of Classification Search ............... 345/744; 715/744; 710/10
See application file for complete search history.

(56) References Cited

U.S. PATENT DOCUMENTS

| | | | | |
|---|---|---|---|---|
| 6,244,762 B1 * | 6/2001 | Fukano et al. | ............... | 400/70 |
| 6,442,559 B1 * | 8/2002 | Martinsen et al. | ........... | 707/102 |
| 6,470,381 B2 * | 10/2002 | De Boor et al. | ............. | 709/217 |
| 6,668,376 B1 * | 12/2003 | Wang et al. | .................. | 717/178 |
| 6,671,749 B2 * | 12/2003 | Williams et al. | .............. | 710/10 |
| 6,694,320 B1 * | 2/2004 | Ortiz et al. | ................... | 707/101 |
| 2002/0036658 A1 * | 3/2002 | Carolan et al. | ............... | 345/764 |
| 2002/0053082 A1 * | 5/2002 | Weaver et al. | .................. | 725/46 |
| 2002/0065772 A1 * | 5/2002 | Saliba et al. | .................... | 705/40 |
| 2002/0095501 A1 * | 7/2002 | Chiloyan et al. | ............ | 709/227 |
| 2002/0099804 A1 * | 7/2002 | O'Connor et al. | ........... | 709/220 |
| 2002/0122056 A1 * | 9/2002 | Bhesania et al. | ............ | 345/744 |
| 2002/0157091 A1 * | 10/2002 | DeMello et al. | ............. | 717/178 |
| 2003/0043771 A1 * | 3/2003 | Mizutani et al. | ............ | 370/338 |
| 2003/0135668 A1 * | 7/2003 | Abe | ............................ | 710/15 |
| 2004/0204946 A1 * | 10/2004 | Alger et al. | ..................... | 705/1 |
| 2005/0251458 A1 * | 11/2005 | Perkowski | .................... | 705/26 |
| 2006/0259549 A1 * | 11/2006 | Huang | ......................... | 709/203 |

FOREIGN PATENT DOCUMENTS

| | | |
|---|---|---|
| GB | 2 347 530 | 8/1999 |
| WO | WO/01/86922 | 11/2001 |

* cited by examiner

*Primary Examiner*—Weilun Lo
*Assistant Examiner*—Tuyetlien T Tran
(74) *Attorney, Agent, or Firm*—Ridout & Maybee LLP

(57) ABSTRACT

A method of customizing the branding of utility software associated with a customized computer peripheral device. The customized peripheral device includes brand data stored in memory. The utility software includes a branding module that reads the brand data from the peripheral device during installation upon a computer and customizes the utility software based upon the brand data. The brand data may include the custom branding information or may provide a brand identifier that permits the branding module to obtain the correct custom branding information from a remote server.

22 Claims, 2 Drawing Sheets

COMPUTER PERIPHERAL PRODUCT AND METHOD OF BRANDING UTILITY SOFTWARE ASSOCIATED WITH SAME

FIELD OF THE INVENTION

The present invention relates to computer peripheral products and, in particular, to branding utility software associated with computer peripheral devices.

BACKGROUND OF THE INVENTION

An important issue for participants in the retail marketplace for computer-related devices is brand recognition and development of brand value. In many situations, products developed by a manufacturer are marketed and sold by other entities in the downstream sales channel as their own products. The branding of a product to accommodate the commercial interests of different participants in the sales channel presents logistical difficulties.

By way of example, in the field of mobile devices, such as handheld computing devices, a single manufacturing company may produce a mobile device for sale through a number of sales channels such as, for example, a variety of wireless telecommunications providers. These providers wish to have the products they sell customized to reflect their brand graphics and nomenclature.

With respect to the hardware, the manufacturing company typically produces as many variations of the hardware as there are sales channels so as to accommodate the need to have customized branding on the hardware. There may be other customizations to the hardware that are specific to a sales channel other than the branding.

In the case of computer peripheral products, the product includes both the peripheral device itself, which is made up of the device hardware and any software operating upon the hardware, and associated utility software for installation and operation upon a computer or workstation to which the computer peripheral is to be attached. The associated utility software may not vary for different sales channels aside from the customized branding desired by the sales channel. Sales channel participants often require that their specific branding and nomenclature be reflected in both the peripheral device itself and in the utility software, so that the user interface on the computer or workstation reflects the specific participant brand.

The manufacturing company in this situation is faced with the expense and difficulty of creating, storing, and managing a number of different versions of the utility software in order to provide customized branding for the different sales channels. This leads to problems, including logistical difficulties in ensuring that the correct utility software is packaged with the correct customized peripheral device.

It would be advantageous to accommodate the desire for customized branding without the need to create, store, and distribute customized versions of the utility software.

SUMMARY OF THE INVENTION

The present invention provides a method of customizing the branding of utility software after distribution based upon brand data stored upon the peripheral device. Accordingly, a single version of the utility software may be created and distributed with the various versions of the peripheral device, while still resulting in brand-customized utility software once installed by a user on a computer or workstation.

In one aspect, the present invention provides a computer peripheral product for operation in connection with a computer. The computer peripheral product includes a peripheral device, the peripheral device having stored thereon brand data, and a computer readable media having encoded thereon utility software for installation upon the computer, the utility software including a branding module for receiving the brand data from the peripheral device and customizing the utility software based upon the brand data.

In another aspect the present invention provides a method of customizing a computer peripheral product, the computer peripheral product including a peripheral device and associated utility software, the peripheral device having stored thereon brand data, the utility software being for operation upon a computer and including a branding module. The method includes the steps of reading the brand data stored upon the peripheral device and customizing the utility software in response to the brand data read from the peripheral device.

Other aspects and features of the present invention will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present invention, and in which.

Similar reference numerals are used in different figures to denote similar components.

DESCRIPTION OF SPECIFIC EMBODIMENTS

The following description of one or more specific embodiments of the invention does not limit the implementation of the invention to any particular computer language or computer operating system. Any limitations presented that result from a particular computer language or a particular operating system are not intended as limitations of the present invention.

Figure 1:
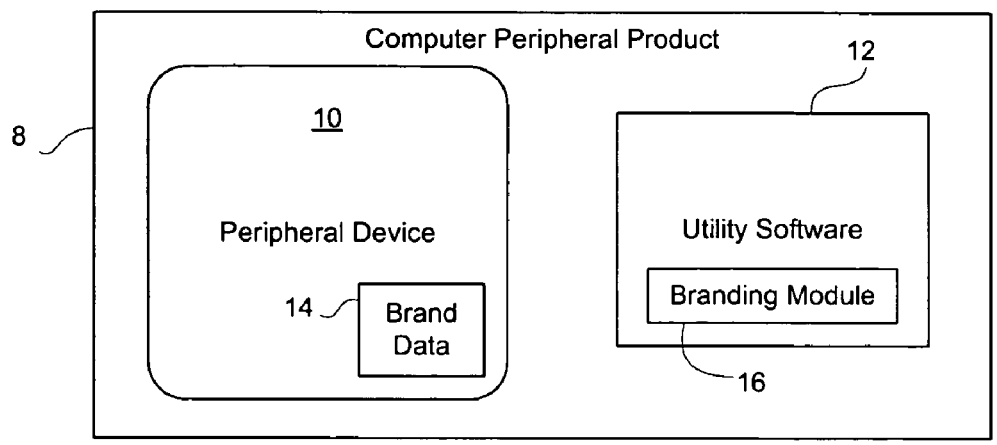
FIG. 1 shows a block diagram of a computer peripheral product.

Reference is first made to FIG. 1, which shows a block diagram of a computer peripheral product 8, according to the present invention. The computer peripheral product 8 includes a peripheral device 10 and associated utility software 12. The peripheral device 10 includes brand data 14. The brand data 14 may be stored within persistent memory on the peripheral device 10, such as in flash memory. In other embodiments, the brand data 14 may be provided on magnetic media, such as a removable disk drive, or on read-only memory. In certain embodiments, it may be preferable to store the brand data 14 on a non-removable, customer-read-only media that is easily programmable during the manufacturing process.

The utility software 12 is intended for installation on a computer or workstation to which the peripheral device 10 will be attached. The utility software 12 manages communications between the peripheral device 10 and the computer or workstation. The utility software 12 provides a user interface on the computer enabling a user to communicate with the peripheral device 10 through the computer or to manage data or information on the peripheral device 10. In some embodiments, the utility software 12 provides for synchronization of the peripheral device 10 with the computer, such as in the case of a peripheral mobile device for the wireless reception of electronic messages. The utility software 12 may also provide diagnostic tools and other functions.

The utility software 12 includes a branding module 16 for customizing the utility software 12 based upon the brand data 14. In particular, the branding module 16 customizes the user interface of the utility software 12 to incorporate custom brand information identifying a particular sales channel. The utility software 12 may be encoded upon a computer readable media, such as a compact disc (CD). In some embodiments, the utility software may be encoded upon a computer readable media within the peripheral device 10 itself.

Figure 2:
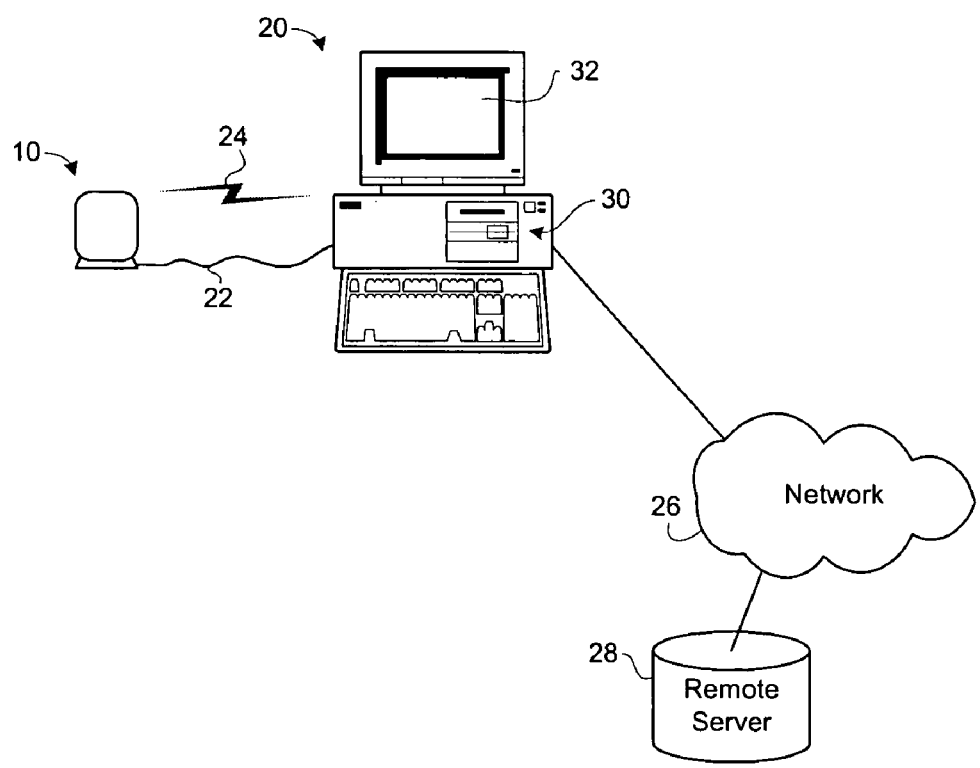
FIG. 2 shows, in diagrammatic form, the peripheral device coupled to a computer.

Reference is now made to FIG. 2, which shows, in diagrammatic form, the peripheral device 10 coupled to a computer 20. The peripheral device 10 may communicate with the computer 20 via a physical link 22, such as a serial or parallel port cable, or via a wireless link 24, such as an infrared link, a Bluetooth link, or other wireless communication links. In some embodiments, the computer 20 is coupled to a network 26, such as the Internet, and is therefore able to connect with a remote server 28 using a suitable communications protocol, such as HTTP, FTP, etc.

The computer 20 has a data input device 30, such as a CD drive, a floppy disc drive, or a USB port. When a user obtains the computer peripheral product 8 (FIG. 1), the user connects the peripheral device 10 to the computer 20. The user also installs the utility software 12 (FIG. 1) upon the computer 20 by inserting the computer readable media upon which the utility software 12 is encoded into the data input device 30. The utility software 12 includes an installation module for installing the utility software 12 on the computer 20 and establishing the user interface with the peripheral device 10. The user interface includes a graphical or textual interface made visible to the user via a display screen 32. In some embodiments, the branding module 16 (FIG. 1) is incorporated as a part the installation module. In other embodiments, the branding module 16 is called by the installation module during the installation process. It will also be understood that if the utility software 12 is stored on the peripheral device 10 itself, then connecting the peripheral device 10 to the computer 10 may initiate a download and installation of the utility software 12 to the computer.

While the utility software 12 is being installed, the branding module 16 reads the brand data 14 (FIG. 1) from the peripheral device 10 via the physical link 22 or the wireless link 24. The brand data 14 identifies the sales channel with which the peripheral device 10 is associated. Based upon the brand data 14 the branding module 16 customizes the utility software 12 based upon the custom branding information for the same sales channel. Accordingly, in one embodiment, the user interface displayed to the user on the display screen 32 incorporates the appropriate logos, trademarks, slogans, contact information, color scheme, or other brand-specific features. In other embodiments, the custom branding information may trigger changes in the functionality of the utility software 12.

If the peripheral device 10 is not coupled to the computer 20 during installation, the user may be prompted to couple the peripheral device 10, or the installation process may not be fully completed until the peripheral device 10 is connected. In one embodiment, the installation process may be completed with blank branding information incorporated into the user interface until the brand data 14 can be read from the peripheral device 10, at which point the installation process will be completed by incorporating the custom branding information into the user interface.

The brand data 14 stored upon the peripheral device 10 may be used by the branding module 16 to customize the user interface for the utility software 12 in a variety of ways. In one embodiment, the brand data 14 comprises custom branding information which the branding module 16 incorporates into the user interface. The custom branding information may include a variety of brand-specific information, including graphics, such as corporate logos, trade-marks, designs, product nomenclature and slogans. The custom branding information may also include other sales channel-specific information, including technical support and contact details. In some embodiments, the custom branding information may include product feature information for customizing the functionality of the utility software 12. For example, peripheral devices 10 having different levels of functionality may be associated with different sales channels and markets and the utility software 12 may be customized to match the functionality it exposes to the peripheral device 10 capabilities.

In some cases, the quantity of custom brand information may be too cumbersome to store on the peripheral device 10 itself due to limited memory. In some embodiments, the brand data 14 comprises a brand identifier. The brand identifier may be any string identifying the specific sales channel to which the utility software 12 should be customized. The string may include a numeric code, a product serial number, a corporate name, or other identifying data.

Having read the brand identifier, the branding module 16 may then connect with the remote server 28 to download the detailed custom branding information via the network 26. The remote server 28 maintains a database of custom branding information associated with individual brand identifiers. By providing the remote server 28 with the brand identifier read from the peripheral device 10, the branding module 16 receives the appropriate custom branding information over the network 26. The location of the remote server 28, i.e. its address on the network 26, may be hard coded into the utility software 12. In such circumstances, the remote server 28 is likely maintained by the manufacturer of the computer peripheral product 8 (FIG. 1).

In another embodiment, the brand data 14 includes a network address for the remote server 28. The branding module 16 then connects to the remote server 28 based upon the network address stored in the peripheral device 10. In this case, the remote server 28 is specific to a particular sales channel, and it returns the appropriate custom branding information to the branding module 16 over the network 26. In these circumstances, the individual sales channel participants may maintain their own remote server, thereby directly controlling the content of the custom branding information.

Those of ordinary skill in the art will appreciate that there are other ways of providing the branding module 16 with custom branding information based upon the brand data 14 stored on the peripheral device 10.

Figure 3:
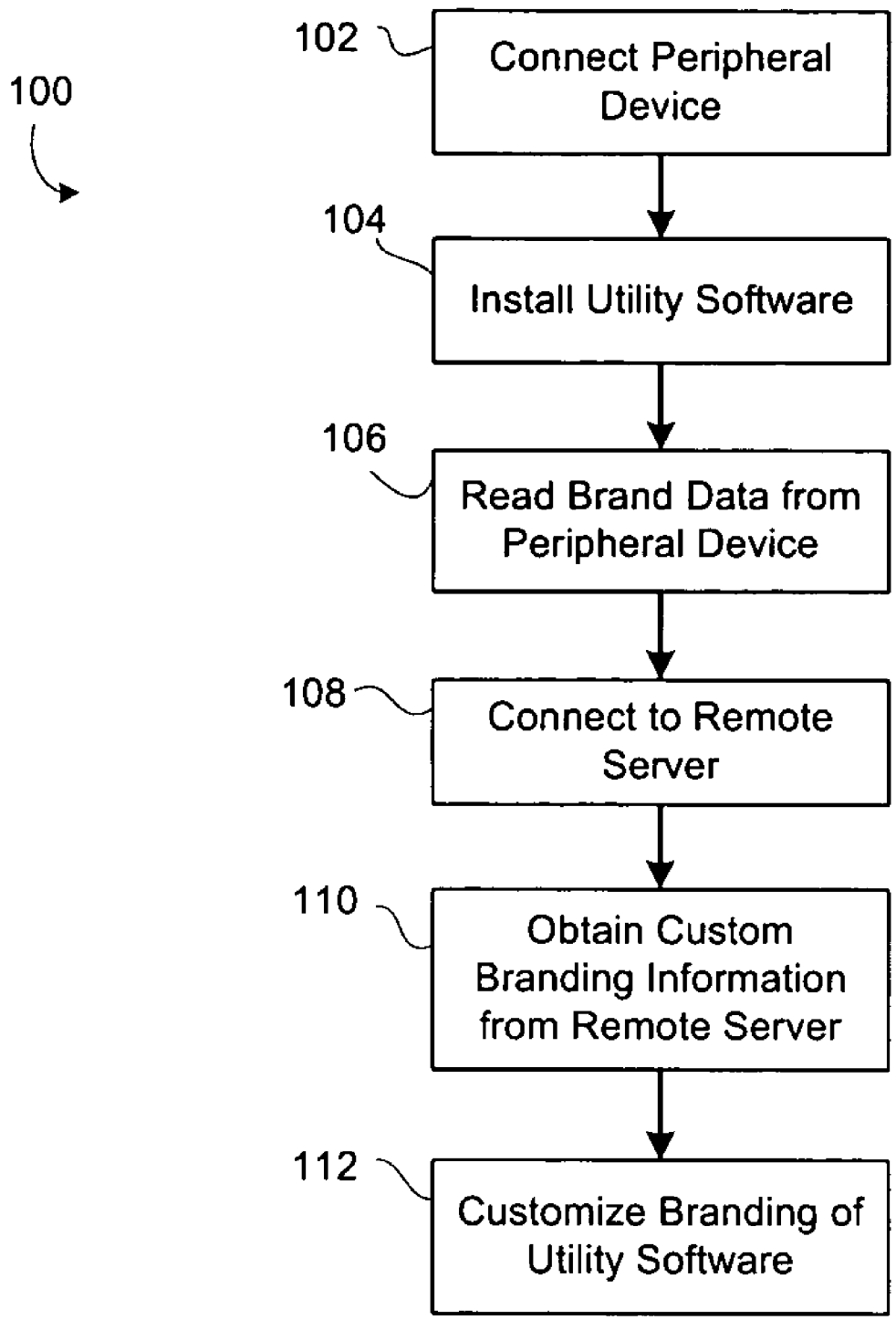
FIG. 3 shows, in flowchart form, a method of customizing utility software.

Reference is now made to FIG. 3, which shows, in flowchart form, a method 100 of customizing utility software, according to the present invention.

The method 100 begins in step 102 when the peripheral device 10 (FIG. 1) is connected to the computer 20 (FIG. 2). Then in step 104 the utility software 12 (FIG. 1) is installed upon the computer 20. It will be appreciated that these steps 102 and 104 may be performed out of sequence.

Once the installation process has been at least initiated in step 104 and the peripheral device 10 is coupled to the computer 20, then in step 106 the branding module 16 (FIG. 1) obtains the brand data 14 (FIG. 1) from the peripheral device 10.

It will be understood that in the embodiment in which the brand data 14 contains all of the custom branding information necessary to customize the user interface for the utility software 12 the branding module 16 proceeds to customize the user interface following step 106. In embodiments in which the brand data 14 does not contain all of the custom branding information, additional steps are necessary, as shown in the method 100 in FIG. 3.

Following step 106, in step 108 the branding module 16 connects to the remote server 28 (FIG. 2) via the network 26 (FIG. 2). As discussed above, in one embodiment the address of the remote server 28 (FIG. 2) is predetermined and coded into the branding module 16. In another embodiment, the brand data 14 may itself provide the address for the remote server 28. In either case, the brand data 14 may include a brand identifier.

The remote server 28 provides the branding module 16 with custom branding information in step 110. Then in step 112, the branding module 16 uses the custom branding information to customize the user interface for the utility software 12.

Accordingly, the customized peripheral device 10 may be marketed and distributed with a single utility software application, which will be customized based upon the brand data 14 stored in the customized peripheral device 10 once the utility software application is installed on a computer or workstation. This permits the manufacturer to customize only the peripheral device 10 and package it with the single utility software application.

In one embodiment, the peripheral device 10 is a wireless mobile device, such as a personal digital assistant (PDA). The wireless mobile device is sold as a package with desktop software. The sales channel participants include wireless telecommunications providers that sell the wireless mobile devices customized with the providers' brand. The desktop software includes the branding module 16 which, upon installation on a personal computer, communicates with the wireless mobile device to obtain the brand data 14 stored on the wireless mobile device. Based upon the brand data 14, the user interface for the desktop software is customized to reflect the branding of the wireless telecommunications providers.

Those of ordinary skill in the art will appreciate that the present invention is not limited to wireless mobile devices. It will also be appreciated that the present invention is not limited to a particular computer programming language or architecture.

The programming of the branding module 16 to obtain the brand data 14 from the peripheral device 10, download the custom branding information from the remote server 28, and customize the user interface to incorporate the custom branding information, will be within the skill of one of ordinary skill in the art in light of the foregoing description.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A computer peripheral product for operation in connection with a computer, the computer peripheral product comprising:
   (a) a mobile wireless device, said mobile wireless device having stored thereon brand data; and
   (b) a computer readable media having encoded thereon utility software for installation upon the computer, said utility software including a branding module for receiving said brand data from the mobile wireless device and customizing the utility software based upon said brand data,
   wherein said utility software enables communications with the mobile wireless device through the computer via a user interface on the computer for interaction with the mobile wireless device and wherein said branding module customizes said user interface based upon said brand data,
   wherein the mobile wireless device and computer readable media are packaged together for distribution as the computer peripheral product and wherein the computer peripheral product does not include the computer.

2. The computer peripheral product claimed in claim 1, wherein said brand data includes a graphic file defining a brand logo, and wherein said branding module customizes said user interface to display said brand logo.

3. The computer peripheral product claimed in claim 1, wherein said brand data includes a brand identifier, wherein said branding module utilizes said brand identifier to obtain custom branding information from a remote server over a network, and wherein said branding module customizes said utility software based upon said custom branding information.

4. The computer peripheral product claimed in claim 3, wherein said utility software includes a server address for locating said remote server, and wherein said branding module downloads said custom branding information from said remote server based upon said brand identifier.

5. The computer peripheral product claimed in claim 3, wherein said brand identifier comprises an address for said remote server.

6. The computer peripheral product claimed in claim 1, wherein said brand data includes product feature information, and wherein said branding module alters the functionality of said utility software based upon said product feature information.

7. The computer peripheral product claimed in claim 1, wherein the computer readable media comprises a compact disc.

8. The computer peripheral product according to claim 1, wherein said utility software further provides for synchronization of said mobile wireless device with the computer and at least one diagnostic tool.

9. The computer peripheral product according to claim 1, wherein said utility software includes an installation module for installing the utility software on the computer and for calling the branding module during an installation process.

10. A method of customizing a computer peripheral product, the computer peripheral product including a mobile wireless device and associated utility software, the mobile wireless device having stored thereon brand data, the utility software being for operation upon a computer and including a branding module, the method comprising the steps of:
   reading the brand data stored upon the mobile wireless device;
   customizing the utility software in response to the brand data read from the mobile wireless device, wherein said utility software enables communication with the mobile wireless device through the computer via a user interface on the computer for interaction with the mobile wireless device, and wherein said branding module customizes said user interface based upon said brand data;

providing a computer readable media storing the utility software; and packaging the computer readable media and mobile wireless device together for distribution as the computer peripheral product, and wherein the computer peripheral product does not include the computer.

11. The method claimed in claim 10, further including a step of coupling the mobile wireless device to the computer.

12. The method claimed in claim 11, further including a step of initiating installation of the utility software upon the computer.

13. The method according to claim 12, further including a step of connecting the computer to the mobile wireless device, and wherein said step of connecting the computer to the mobile device is performed prior to said step of initiating installation.

14. The method according to claim 12, wherein said steps of reading and customizing are performed during said installation.

15. The method according to claim 12, wherein said utility software further provides for synchronization of said mobile device with the computer and at least one diagnostic tool.

16. The method claimed in claim 10, wherein the brand data includes a brand identifier, and wherein customizing includes configuring the branding module to obtain custom branding information from a remote server over a network and customize the utility software to incorporate said custom branding information.

17. The method claimed in claim 16, wherein the utility software includes a server address for locating said remote server, and wherein said branding module downloads said custom branding information from said remote server based upon said brand identifier.

18. The method claimed in claim 16, wherein said brand identifier comprises an address for said remote server.

19. The method claimed in claim 16, wherein said utility software provides a user interface on the computer for interaction with the mobile wireless device, wherein said custom branding information includes a graphic file defining a brand logo, and wherein customizing includes configuring the branding module to customize said user interface to display said brand logo.

20. The method claimed in claim 10, wherein said utility software provides a user interface on the computer for interaction with the mobile wireless device, wherein said brand data includes a graphic file defining a graphic, and wherein configuring includes configuring the branding module to customize the user interface to display said graphic.

21. The method claimed in claim 10, wherein said brand data includes product feature information, and wherein customizing includes configuring the branding module to alter the functionality of the utility software based upon said product feature information.

22. The method claimed in claim 9, wherein the computer readable media comprises a compact disc.

* * * * *